(12) United States Patent
Janehag et al.

(10) Patent No.: US 10,298,122 B2
(45) Date of Patent: May 21, 2019

(54) SWITCHING MODE DC/DC POWER CONVERTER FOR DELIVERING A DIRECT CURRENT TO A PULSE RADAR UNIT

(71) Applicant: SAAB AB, Linköping (SE)

(72) Inventors: Niklas Janehag, Göteborg (SE); Valter Nilsson, Hovås (SE)

(73) Assignee: SAAB AB, Linköping (SE)

( * ) Notice: Subject to any disclaimer, the term of this patent is extended or adjusted under 35 U.S.C. 154(b) by 323 days.

(21) Appl. No.: 15/113,650

(22) PCT Filed: Jan. 23, 2014

(86) PCT No.: PCT/SE2014/050077
§ 371 (c)(1),
(2) Date: Jul. 22, 2016

(87) PCT Pub. No.: WO2015/112062
PCT Pub. Date: Jul. 30, 2015

(65) Prior Publication Data
US 2017/0012524 A1    Jan. 12, 2017

(51) Int. Cl.
*G01S 7/28* (2006.01)
*H02M 3/156* (2006.01)
(Continued)

(52) U.S. Cl.
CPC .............. *H02M 3/156* (2013.01); *G01S 7/02* (2013.01); *G01S 7/28* (2013.01); *H02M 1/126* (2013.01);
(Continued)

(58) Field of Classification Search
CPC ............ G01S 7/02; G01S 7/28; H02M 1/126; H02M 1/15; H02M 2003/1566; H02M 3/156
(Continued)

(56) References Cited

U.S. PATENT DOCUMENTS

2005/0151518 A1    7/2005 Schneiker et al.
2012/0229323 A1    9/2012 Kato et al.
(Continued)

FOREIGN PATENT DOCUMENTS

EP             2490325 A2     8/2012
WO      WO-03/003042 A1     1/2003
WO     WO-2011/002365 A1    1/2011

OTHER PUBLICATIONS

Supplementary Search Report dated Jul. 28, 2017 in European Application No. 14 880 332. 3.
(Continued)

*Primary Examiner* — Timothy A Brainard
(74) *Attorney, Agent, or Firm* — Jeffri A. Kaminski; Venable LLP

(57) ABSTRACT

A switching mode DC/DC power converter for delivering a direct current to a pulse radar unit. A first switching element connects and disconnects the power converter from a power source in each cycle of the power converter. An inductor charges and discharges in each cycle. A capacitor maintains a DC output voltage as the inductor charges and discharges in each cycle. A second switching element transfers energy from the inductor to the capacitor when the first switch disconnects the switching mode power converter from the power source. A control loop regulates the voltage with a time constant, to a predetermined value by controlling the first switching element. An on time for the first switching element in each cycle is chosen to allow the current through the inductor to fall to zero in each cycle. The cycle is shorter than RF pulse duration and time constant of the control loop is longer than the RF pulses.

11 Claims, 2 Drawing Sheets

(51) Int. Cl.
 *G01S 7/02* (2006.01)
 *H02M 1/12* (2006.01)
 *H02M 1/15* (2006.01)

(52) U.S. Cl.
 CPC ...... *H02M 1/15* (2013.01); *H02M 2003/1566* (2013.01)

(58) Field of Classification Search
 USPC ......................................................... 342/202
 See application file for complete search history.

(56) References Cited

U.S. PATENT DOCUMENTS

| | | |
|---|---|---|
| 2012/0299646 A1 | 11/2012 | Southcombe et al. |
| 2013/0070494 A1* | 3/2013 | Rotzoll ................ H02M 7/003 363/80 |

OTHER PUBLICATIONS

PCT/ISA/210—International Search Report—dated October 20, 2014 (Issued in Application No. PCT/SE2014/050077).
PCT/ISA/237—Written Opinion of the International Searching Authority—dated October 20, 2014 (Issued in Application No. PCT/SE2014/050077).

\* cited by examiner

SWITCHING MODE DC/DC POWER CONVERTER FOR DELIVERING A DIRECT CURRENT TO A PULSE RADAR UNIT

CROSS-REFERENCE TO RELATED APPLICATIONS

The application is the national phase under 35 U.S.C. § 371 of PCT/SE2014/050077 filed 23 Jan. 2014.

TECHNICAL FIELD

The present invention relates to a switching mode DC/DC (Direct Current/Direct Current) power converter for delivering a direct current to a pulse radar unit configured to transmit RF pulses.

BACKGROUND

Intermittent operation of DC, Direct Current, supplied loads is common in many electrical systems. Radar RF, Radio Frequency, transmitters are one example of such load. Semiconductors are commonly used in RF power transmitters today. Supply voltages have become lower compared to prior transmitters, using vacuum tubes or similar, due to properties for semiconductors. Consequently have currents become equally higher for the same amount of power.

Modern AESA, Active Electronically Scanned Array, radar systems are made up from multiple solid state transceivers each connected to an antenna element being a part of an array of antenna elements. DC/DC converters and voltage regulators, powered from a DC bus, are distributed to each transceiver or to a group of transceivers.

The radar transmits RF pulses at a repetitions rate often referred to as the Pulse repetition Frequency, PRF. Pulse length and repetitions rate depend on usage of the radar system. This RF pulse mode operation is transformed to pulsating loads in the DC supply system, which even may be reflected back to the power supply source. This causes energy losses as well as risks for decreased performance and interference with other electrical systems. Control problems in an AC generator due to pulsating power load, is one example of interference that has been experienced. Another issue that has been discussed repeatedly is the risks for mechanical wear and tear in the generator and associated gearbox when supplying pulse operated systems, e.g. AESA radars.

FIG. 1 shows a typical supply for an AESA radar transmitter. An AC/DC 10 converter supplies a DC bus 11 voltage to distributed DC/DC-converters 20 each supplying a transmitter PA 30, Power Amplifier, or a group of transmitter PAs 30 with regulated DC voltage. The PAs 30 transmits pulsed electromagnetic RF signals. Effects from this pulsed operation are reflected back to the DC supply and also potentially further back to the AC supply. The intermittent power demand makes the supply currents become pulse modulated. For low pulse repetition rates there is an apparent risk for current modulation to propagate even to the AC-supply source 40. Capacitors (not shown) are placed on the voltage supply close to the transmitter and on the output of the DC/DC-converter 20 in order to enable supply of the pulse current drawn from the transmitters.

Pulsed loads reflected from the transmitters at higher PRF (>5 kHz) could often be adequately filtered using passive filters (LC-filters). The filters required for filtering at lower PRF will become bulky and would in most cases require too much space.

A current regulation loop could then be included in the DC/DC converter in order to charge the capacitors with a limited current striving to produce a constant supply current being the average of the pulsed current. This adds complexity and the trade off between voltage regulation and current regulation performance is not that easy to manage. Especially when taking all load conditions—full range of PRF and variations of duty cycle—into account. More advanced regulation techniques could then be implemented in order to improve voltage regulation and still filtering out the pulse currents. Additional input signals may be required, where information on radar operation (PRF etc) is supplied in advance in order to manage voltage regulation. This adds complexity and for an AESA radar—may be including hundreds of transmitters—this could be hard to handle. A digital SW based system would probably be suitable. It is, as already mentioned, preferred to filter out pulse currents completely close to the load (transmitter). In a practical implementation is filtering often distributed along the power supply chain in several steps in order to handle proper supply for all conditions. Load current filtering at lower PRF is often handled in the central AC/DC-converter 10.

The result is that fairly high pulse currents are reflected quite far back in the distribution. This could have impact on overall performance, e.g. power efficiency, EMC.

There is therefore a need for an improved solution for filtering of pulsed loads, which solution solves or at least mitigates at least one of the above mentioned problems.

SUMMARY

It is understood by the inventor that it is highly desirable to provide filtering of currents without any active current regulation involved and no additional passive filtering required. According to embodiments of the present invention are voltage conversion and filtering managed in the same circuit.

It is required to design power supply with capability to handle large current fluctuations still keeping voltage adequately regulated. Proper voltage regulation performance and low ripple are crucial for spectral purity in a radar transmitter One object is to make the equipment draw continuous current from the power source by enable return paths for the pulse currents as close as possible to the transmitters.

This object is attained by a switching mode DC/DC (Direct Current/Direct Current) power converter for delivering a direct current to a pulse radar unit configured to transmit RF pulses with pulse duration. The switching mode power converter comprising: a first switching element configured to connect and disconnect the switching mode power converter from a power source in each cycle of the power converter. An inductor configured to charges and discharges in each cycle of the power conversion. A capacitor configured to maintain a DC output voltage as the inductor charges and discharges in each cycle. A second switching element configured to transfer energy from the inductor to the capacitor when the first switch disconnects the switching mode power converter from the power source. A control loop regulating the voltage with a time constant, to a predetermined value by means of controlling the first switching element. An on time for the first switching element in each cycle is chosen to allow the current through the inductor to fall to zero in each cycle. The cycle is shorter than RF the pulse duration and that the time constant of the control loop is longer than the RF pulses.

The switching mode power converter according to the present invention has a switching frequency considerable higher than the pulse load duration and control parameters which introduce high impedance towards the power source. While the capacitor serves as a low impedance path thus sourcing the additional current required during transmission of the radar pulse, resulting in close to constant current drawn from the power source.

An advantage with embodiments of the switching mode power converter according to the present invention is that less complex regulation is required, only voltage regulation is required.

Another advantage with embodiments of the switching mode power according to the present invention is that fewer components are required.

Yet another advantage with embodiments of the switching mode power according to the present invention is that a smaller inductance is required. The circuit is therefore smaller.

Another advantage with embodiments of the switching mode power according to the present invention is damped filter response.

Yet another advantage with embodiments of the switching mode power according to the present invention is no or reduced pulsating current in distribution cables.

Yet a further advantage with embodiments of the switching mode power according to the present invention is that less filtering on the output in central power supply (AC/DC) is required.

BRIEF DESCRIPTION OF THE DRAWINGS

The objects, advantages and effects as well as features of the invention will be more readily understood from the following detailed description of exemplary embodiments of the invention when read together with the accompanying drawings, in which.

DETAILED DESCRIPTION

Figure 1:
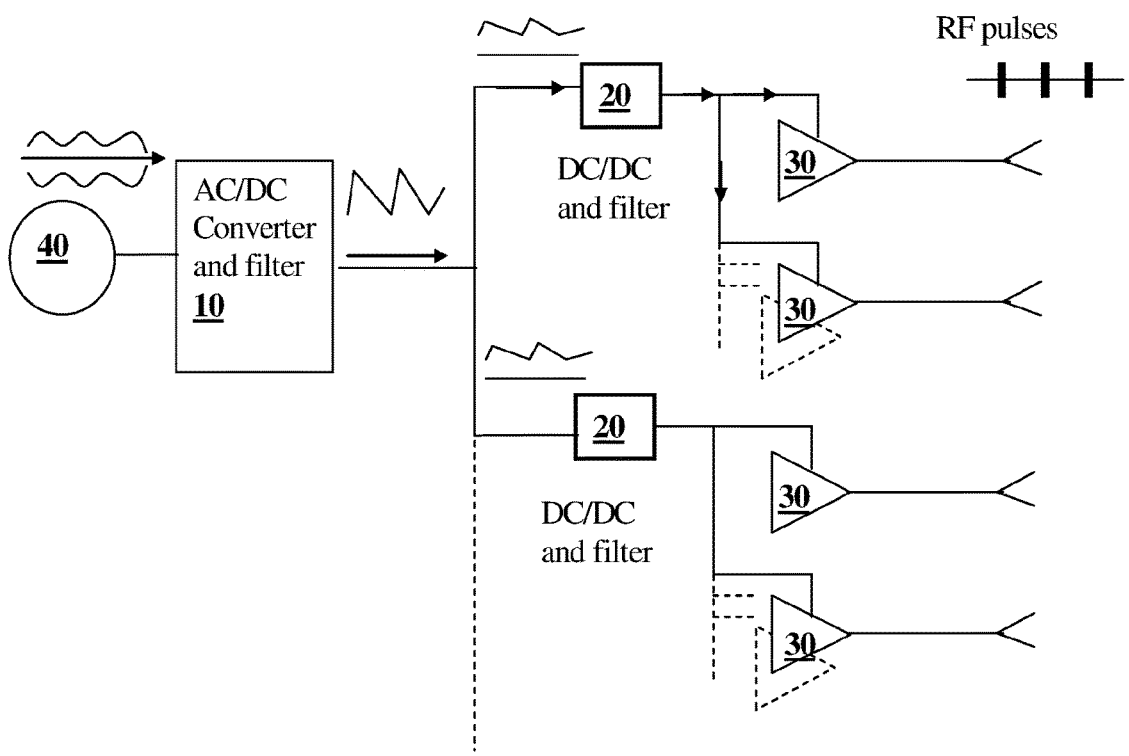
FIG. 1 illustrates a typical supply for an AESA radar transmitter

The present invention will be described more fully hereinafter with reference to the accompanying drawings, in which preferred embodiments of the invention are shown. The invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like reference signs refer to like elements.

Common practice for design of DC/DC converters including inductance for conversion is design for operation in Continuous Current Mode, CCM. Reasons for operation in CCM mode are that voltage conversion and voltage regulation properties work better in CCM. It should be noted that switching currents generally also is lower when designing for CCM. One idea with the present invention presented here is to design a switched mode DC/DC converter, where filtering of current harmonics generated from the load is the main objective. Further is the switched mode filter according to the exemplary embodiments of the present invention mainly intended for filtering of intermittent/pulsed loads, where the repetition rate is low. Example of such loads is RF power transmitters in AESA radar systems.

Figure 2:
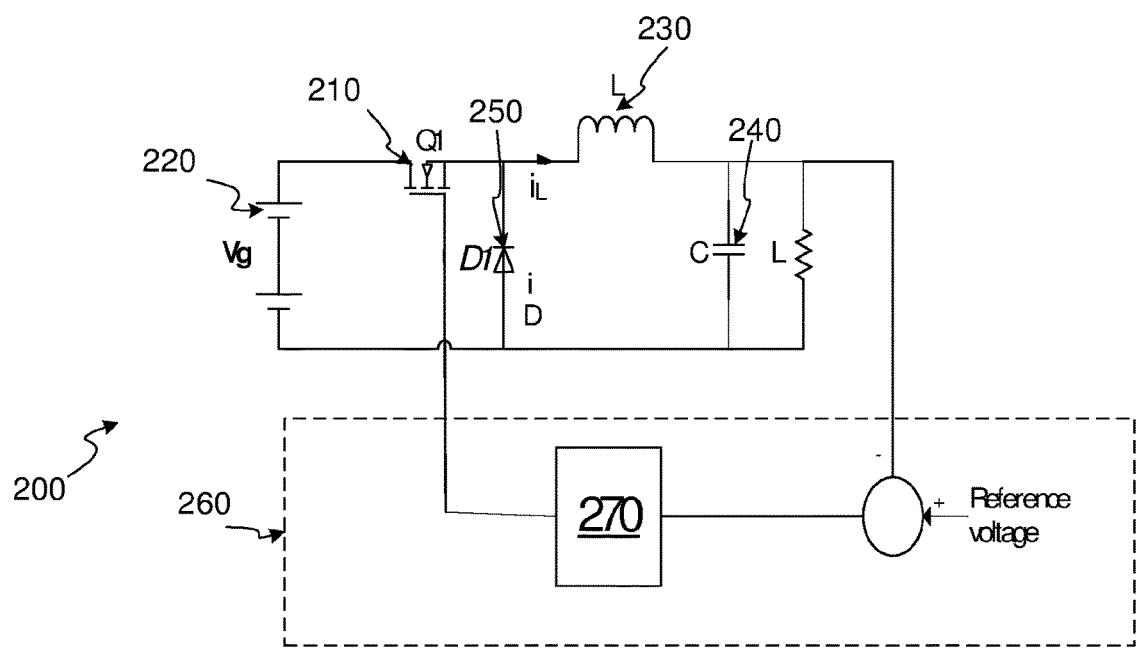
FIG. 2 illustrates a switching mode DC/DC power converter according to an exemplary embodiment of the invention.

Referring to FIG. 2, there is illustrated a switching mode DC/DC power converter 200 for delivering a direct current to a pulse radar unit (not shown) configured to transmit RF pulses with a pulse duration, according to an exemplary embodiment of the present invention. The invention is in this exemplary embodiment is illustrated with a step down converter, but the invention could be applied on any type of converter including inductance for conversion, e.g. any of the types Buck, Boost or Buck-Boost. The switching mode power converter 200 comprises a first switching element 210 configured to connect and disconnect the switching mode power converter from a power source 220 in each cycle of the power converter. The first switching element 210 could be implemented as any type of controllable electrical switch, preferable semiconductor device such as BIP, MOSFET, or IGBT. Further the switching mode power converter 200 comprises an inductor 230 configured to charges and discharges in each cycle of the power conversion and a capacitor 240 configured to maintain a DC output voltage as the inductor 230 charges and discharges in each cycle. In the power converter according to the present invention there is also a second switching element 250 configured to transfer energy from the inductor 230 to the capacitor 240 when the first switch 210 disconnects the switching mode power converter from the power source 220.

During on time the power source 220 charges the inductor 230 simultaneously as the capacitor 240 and load are supplied. During off time, energy stored in the inductor 230 is supplied to an output using the second switching element 250 to close a current path to the output. The capacitor 240 shunts ripple currents and maintain a smooth DC voltage on the load.

Further, the power converter 200 according to the present invention comprises a control loop 260 configured to regulate the voltage with a time constant 270, to a predetermined value by means of controlling the first switching element 210.

In an exemplary embodiment of the power converter according to an exemplary embodiment of the present invention the on time for the first switching element 210 in each cycle is chosen to allow the current through the inductor to fall to zero in each cycle. An advantage with this feature is that this introduces an apparent resistance for reduction of cut-off frequency of the output. Another feature of the power converter according to this exemplary embodiment of the present invention is that the cycle is shorter than the RF pulse duration. An advantage with this feature is that this maintains isolation/filtering of load pulses/RF pulses. Yet another feature of the power converter according to this exemplary embodiment of the present invention is that that the time constant of the control loop is longer than the RF pulses.

An advantage with this feature is that this prevents modulation from the RF pulses to be transferred to the power source.

In yet another exemplary embodiment of the switching mode DC/DC power converter according to the present invention is the output voltage polarity inverted compared to the input voltage. In some applications only negative voltage is available, but the amplifier to be supplied needs positive voltage. The situation can also be the other way around, only positive voltage is available, but the amplifier to be supplied needs negative voltage. An advantage is then that the voltage inversion can easily be integrated in the filter instead of the need for an additional converter, which would require more components and more space.

In a yet further exemplary embodiment of the switching mode DC/DC power converter according to the present invention the output is electrically isolated from the input.

According to one exemplary embodiment of the switching mode DC/DC power converter according to the present invention is the first switching element 210 on for a constant time and the cycle time of the switching mode DC/DC power converter is varied. In this exemplary embodiment a determined amount of energy is stored in the inductor and the cycle time determines how often this needs to be repeated to maintain the supply to the load. An advantage of the first method is a linear relationship between the cycle time and transmitted power. For applications with low loads, it has been found that better efficiency often can be achieved compared to where the on time for the first switching element 210 variable.

In a yet another exemplary embodiment of the switching mode DC/DC power converter according to the present invention is the on time for the first switching element variable. In this exemplary embodiment is the cycle time of the switching mode DC/DC power converter fixed. For applications with very low/light loads, it has been found that the better performance can often be achieved compared to when on time for the first switching element 210 is fixed. The on time can be controlled to zero or near zero in each cycle. Variable cycle time means that the repetition rate can be zero or very low, which becomes impractical, among others due to that the capacitor on the output needs to maintain the voltage.

Possible variation of the on time for the first switching element 210 is limited either by that the on time must be short enough so that the power converter always remains in discontinuous mode, which is a prerequisite for the function of the present invention. Theoretically can thus the on time for the first witching element never be allowed to be equal to the cycle time for the power converter, i.e. the duty factor is less than 1.

This is regardless of how the switching mode DC/DC power converter designed. Minimal on time for the first switching element 210 time can be allowed to be zero, which would mean that the first switching element 210 is not turned on in one or more cycles.

In yet another exemplary embodiment there is a combination of the methods on time for the first switching element 210 variable and constant on time for the first switching element 210. In this exemplary embodiment would the cycle time for the first switching element 210 temporarily change in increment of the cycles of the load.

In another exemplary embodiment of the switching mode DC/DC power converter according to the present invention is the cycle further synchronised with the RF the pulse duration.

Appliances with electric switches with short switching times where higher outputs are handled such as in the switching mode DC/DC converter according to the present invention may creates interference that may adversely impact on other systems, such as those supplied. In this case the pulse radar unit. By synchronising the cycle with the RF-pulse duration interference is distributed in the frequency spectrum in a controlled manner so that its impact can be eliminated or reduced. In radio or radar applications, the purity and consistency of the RF signal is of utmost importance for performance, sensitivity and range.

In another exemplary embodiment of the switching mode DC/DC power converter according to the present invention is the cycle further a multiple of the RF-pulse duration.

This also has the effect that interference from the DC/DC power converter can be reduced or eliminated.

In yet another exemplary embodiment of the switching mode DC/DC power converter according to the present invention is the cycles further a multiple of a system clock.

The system clock is assumed to have significantly shorter cycle time than the pulse length. I.e. form the basis of the smallest increment that the pulse can be adjusted. The same system clock can advantageously also be used for other peripheral functions such as digital control in proximity to the transmitter. An advantage with using the system clock is that interference signals are moved to higher frequencies e.g. interference can be moved outside interference frequencies for the radar receiver.

In a further exemplary embodiment of the switching mode DC/DC power converter according to the present invention is the cycle is $1/100$ to $1/1000$ of the RF the pulse duration.

In one exemplary embodiment the radar has a pulse rate frequency of 100 Hz and a duty factor of 10 percent. On that basis the cycle time of the switching mode DC/DC power converter range from 10 micro seconds to 0.1 micro seconds. This may be a practically useful range. The advantage with this configuration is that there are simple and inexpensive components and technology available that simultaneously satisfy the requirements demanded.

In yet another exemplary embodiment of the switching mode DC/DC power converter according to the present invention the time constants are predetermined values adapted to different load cycles. In yet another exemplary embodiment of the switching mode DC/DC power converter according to the present invention the predetermined values of the time constants are retrieved from a memory. An advantage with a solution where the predetermined values of the time constants are retrieved from a memory is that this solution is very flexible. A hardware solution cannot be update easy, but instead requires modifications to the hardware.

In a yet further exemplary embodiment of the switching mode DC/DC power converter according to the present invention is the time constant of the control loop at least 10 times longer than the RF pulses. The control loop task is to regulate the voltage with a time constant, to a predetermined value by means of controlling the first switching element 210.

When the load is pulse shaped, this will be reflected as an AC component of the output voltage. The capacitor is configured to maintain a DC output voltage as the inductor charges and discharges in each cycle and supplies the current required during the RF pulses. This discharge causes the voltage to decreases linearly with a size determined by the value of the capacitor.

The capacitor is then recharged with a linear current, which corresponds to the average of the load, during the "pause" of the RF pulses. To achieve the goal of the switching mode DC/DC power converter according to the present invention, which is to supply a constant current, the time constant of the voltage regulation (which has a direct bearing on the control bandwidth) be limited so that the switching mode DC/DC power converter is prevented from adding modulation of the current. This means that components in the above described load variation present in the feedback signal must be limited.

The slower the control system is in relation to the load frequency, the smaller is the impact on the current. The negative consequence is that the regulation of the output voltage at the same time slows down and doesn't regulate as fast to possible changes in the loading pattern, where the average value of the load current to the radar amplifier is changed. The consequence is that a choice must be made, select the time constant that provides proper balancing between filtering the power and the ability to regulate the voltage to changing load patterns.

The description above is of the best mode presently contemplated for practicing the present invention. The description is not intended to be taken in a limiting sense, but is made merely for the purpose of describing the general principles of the invention. The scope of the present invention should only be ascertained with reference to the issued claims.

The invention claimed is:

1. A switching mode DC/DC power converter for delivering a direct current to a pulse radar unit configured to transmit RF pulses with a pulse duration, the switching mode DC/DC power converter comprising:
   a first switching element configured to connect and disconnect the switching mode power converter from a power source in each cycle of the switching mode power converter;
   an inductor configured to charge and discharge in each cycle of the power conversion;
   a capacitor configured to maintain a DC output voltage as the inductor charge and discharge in each cycle;
   a second switching element configured to transfer energy from the inductor to the capacitor when the first switch disconnects the switching mode power converter from the power source;
   a control loop regulating the voltage with a time constant, to a predetermined value by controlling the first switching element;
   wherein an on time for said first switching element in each cycle is chosen to allow the current through the inductor to fall to zero in each cycle, the cycle is shorter than the pulse duration, and wherein the time constant of the control loop is longer than the pulse duration of the RF pulses.

2. The switching mode DC/DC power converter according to claim 1, wherein the power converter is any of the types Buck, Boost or Buck-Boost.

3. The switching mode DC/DC power converter according to claim 1, wherein a polarity of the DC output voltage polarity is inverted compared to an input voltage.

4. The switching mode DC/DC power converter according to claim 1, wherein said on time for said first switching element is variable within the cycle.

5. The switching mode DC/DC power converter according to claim 1, wherein the cycle is further synchronized with the pulse duration.

6. The switching mode DC/DC power converter according to claim 1, wherein the cycle further is a multiple of the RF-pulse duration.

7. The switching mode DC/DC power converter according to claim 1, wherein the cycle further is a multiple of a system clock.

8. The switching mode DC/DC power converter according to claim 1, wherein the cycle is $1/100$ to $1/1000$ of the pulse duration.

9. The switching mode DC/DC power converter according to claim 1, wherein the time constant of the control loop is predetermined values adapted to different load cycles.

10. The switching mode DC/DC power converter according to claim 9, wherein the predetermined values are retrieved from a memory.

11. The switching mode DC/DC power converter according to claim 1, wherein the time constant of the control loop is at least 10 times longer than the pulse duration of the RF pulses.

* * * * *